United States Patent Office 3,629,292
Patented Dec. 21, 1971

3,629,292
PROCESS FOR THE PREPARATION OF 2,5-DI-ALKYL-4-HYDROXY-(2H)-FURAN-3-ONES
William J. Evers, Long Branch, N.J., assignor to International Flavors & Fragrances Inc., New York, N.Y.
No Drawing. Filed Feb. 10, 1970, Ser. No. 10,275
Int. Cl. C07d 5/16
U.S. Cl. 260—347.8                12 Claims

ABSTRACT OF THE DISCLOSURE

Processes for the preparation of dialkylhydroxyfuran-3-ones which comprise reacting dihalodiketones having the structure

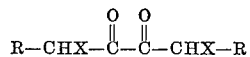

wherein each X is a halogen atom and R is lower alkyl, with aqueous alkali at 75° to 125° C.

BACKGROUND OF THE INVENTION

This disclosure relates to the preparation of hydroxyfuranones.

Some interest has recently developed in various uses for alkyl-substituted hydroxyfuranones. 2,5-dimethyl-4-hydroxy-2H-furan-3-one has been isolated from pineapple juice and is found to have a strong, fruity fragrance. Such organoleptic properties obviously suit it for use in a wide variety of flavors. For example, it can be used in the production of non-pineapple fruit flavors such as strawberry, raspberry, and the like.

It is generally prohibitively expensive to obtain such furanones from natural sources since the starting materials in many instances are themselves expensive and the furanones occur in relatively low concentrations. Some syntheses have been suggested for preparation of the furanones, but these involve protracted, multi-step procedures and the yields and conversions are not very good. This results in relatively high cost for the furanones, even when produced by such syntheses.

THE INVENTION

The present invention provides a very attractive, straightforward method for the production of a variety of dialkyl-substituted hydroxyfuranones. Briefly, the processes of the present invention for the production of alkyl-substituted hydroxyfuranones comprise reacting a dihalodiketone having the formula

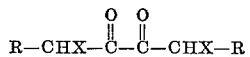

wherein each X represents a halogen atom and R represents an alkyl group, with an aqueous alkali at a temperature of from about 75° to about 125° C. In certain embodiments of the invention, the dihalodiketone is produced by reacting a halogen with an appropriate dialkanoyl, as further described hereinafter.

The particular starting material utilized in the processes of this invention is determined by the particular hydroxyfuranone to be produced. The hydroxyfuranones provided by the present process are 2,5-dialkyl-4-hydroxy-(2H)-furan-3-ones having the formula

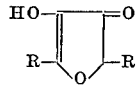

wherein each R is an alkyl group as in the dihalodiketone set forth above. The alkyl groups are desirably lower alkyl groups having from one to six carbon atoms, and alkyl groups having from one to three carbon atoms are preferred. The dimethyl-substituted furanones are especially preferred in certain uses, and accordingly the process carried out when each R is methyl is especially preferred.

In one aspect of the invention the dihalodiketone is prepared from a dialkanoyl, more particularly a diketone having the formula

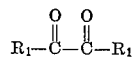

wherein $R_1$ represents an alkyl group having one more carbon atom than does R in the aforesaid formulas, by reaction with a halogen. Thus, treatment of dipropionyl with a halogen would provide 2,5-dihalo-3,4-hexanedione, which in turn can be used to produce the 2,5-dimethyl-4-hydroxy-(2H)-furan-3-one.

The halogens contemplated for use herein include chlorine, bromine, and iodine. The dibromo diketone is preferred because it can more readily be prepared and provides better yields of product.

The dihalodiketone is produced by treatment of the dialkanoyl with an approximately stoichiometric amount of the appropriate halogen under acidic conditions. The halogen is added slowly to the acidic dialkanoyl. The reaction generally proceeds more facilely at temperatures above ordinary room temperature, desirably from 30° to 80° C. Chlorine can be bubbled directly through the dialkanoyl, while the treatment with bromine is readily carried out by adding the bromine in a carrier or solvent, desirably a halogenated hydrocarbon such as carbon tetrachloride. The diiododiketone is conveniently prepared by treating the dibromo material with an alkali metal iodide, such as sodium iodide, in the presence of a vehicle, such as acetone.

The dialkanoyl is acidified with a small quantity of a mineral acid, desirably a hydrogen halide. It is preferred to use the hydrogen halide corresponding to the halogen being added to the dialkanoyl. The reaction time for production of the dihalodiketone is selected to provide good completeness, and times of from about one to about four hours are desirable. The dihalodiketone so produced is then washed to remove the acid and can be further washed and/or neutralized as required. It can then be purified by conventional methods such as extraction, distillation, and like techniques or a combination of such techniques.

The dihalodiketone should be of relatively high purity to provide a high purity product, minimize side reactions, and facilitate recovery of the hydroxyfuranone. It is accordingly desirable that the dihalodiketone be at least 90 percent pure. All parts, proportions, percentages and ratios herein are by weight unless otherwise indicated.

The dihalodiketone is admixed with an aqueous reaction medium. It is preferred to carry out the reaction under an inert atmosphere such as nitrogen to exclude oxygen and thereby prevent unwanted oxidation of the dihalodiketone and the hydroxyfuranone product at the elevated reaction temperatures. The furanone formation is carried out at a reaction temperature of at least about 75° C. to obtain a good yield of product. While the reaction does proceed to provide some furanone product in aqueous media under five atmospheres absolute pressure, the yields become markedly worse under such conditions. It is accordingly desirable to conduct the reaction at a temperature corresponding to a pressure not substantially above 2 atmospheres absolute, namely, at about 125° C. The desired temperature range for the reaction is accordingly from about 75° C. to about 125° C. It is especially preferred to perform the reaction at from 90° to 102° C.

While some alkali can be added to the aqueous mixture below the desired reaction temperature, it is preferred to raise the temperature of the reaction mixture to the reaction temperature prior to any addition of alkali. The alkali added can be a hydroxide or a strongly basic salt of an alkali metal or alkaline earth metal. Thus, salts such as carbonates and bicarbonates are useful and are considered equivalent to hydroxide herein. For this reason, where the process is hereinafter described in terms of the use of hydroxide, it will be understood that such equivalent alkalis are also contemplated. Alkaline earth metal hydroxide, e.g. calcium hydroxide, can be used as can lithium, sodium, potassium and like alkali metal hydroxides. The alkali metal hydroxides are preferred, and sodium and/or potassium hydroxide are particularly preferred. The alkali is desirably added in aqueous solution to facilitate control of the reaction.

The quantity of alkali used in the reaction is desirably at least stoichiometric with the halogen, that is, two moles of alkali are added for each mole of dihalodiketone. The quantity of alkali can be somewhat in excess of the stoichiometric amount up to about 20 percent excess. Beyond this excess no advantage is obtained, and the further washing and purification of the hydroxyfuranone is made more difficult.

As noted above, the reaction can be carried out at atmospheric or superatmospheric pressures. It is not generally desirable to use pressures over two atmospheres absolute, and the preferred pressures are from about one to two atmospheres absolute. The reaction is carried out for from thirty minutes to eight hours, and times of one to four hours are preferred.

The dialkylhydroxyfuranone obtained is extracted, washed, and purified by conventional methods. It is concentrated by distillation and can be further purified by conventional techniques including extraction, crystallization, distillation, preparative chromatographic techniques, and the like.

The following examples are given to illustrate embodiments of the invention as it is presently preferred to practice it. It will be understood that these examples are illustrative, and the invention is not to be considered as restricted thereto except as indicated in the appended claims.

Example I

A reaction flask equipped with a nitrogen gas feed tube, reflux condenser, and agitator is charged with a mixture of 100 g. of 2,5-dibromohexan-3,4-dione and 1165 ml. of water, and the mixture is heated to reflux under a nitrogen atmosphere. When the mixture commences to reflux, a solution of 29.4 g. of sodium hydroxide in 165 ml. of water is added dropwise during 30 minutes. The heating at reflux is then continued for an additional three hours.

After refluxing is discontinued, the reaction mixture is cooled to room temperature, saturated with sodium chloride, and extracted twice with 250 ml. portions of methylene chloride and once with a one-liter portion of methylene chloride. The combined methylene chloride extracts are dried with anhydrous sodium sulfate and concentrated to about 500 ml. by distilling off the methylene chloride at atmospheric pressure. The 500 ml. remaining is distilled in vacuo to yield 29.4 g. of an orange-brown crystalline material.

Distillation of 22.9 g. of the crystalline material provides 13.8 g. of 2,5-dimethyl-4-hydroxy-[(2)H]-furan-3-one, a liquid boiling at 95-105° C. at 2.0-2.5 mm. Hg and which crystallizes on cooling to room temperature. Proton magnetic resonance (PMR) spectroscopy of a sample of the furanone in deuterotrichloromethane shows a doublet at 1.47 p.p.m. (3 protons, $J=7$ Hz.), a doublet at 2.29 p.p.m. (3 protons, $J=1.4$ Hz.), and a quartet at 4.56 p.p.m. (1 proton, $J=7$ Hz., secondary splitting $J=1.4$ Hz.).

The furanone so produced is useful for the production of fruit and other flavors.

Example II

A 500 ml., three-necked flask fitted with a thermometer, mechanical agitator, and a gas inlet tube is charged with 85.6 g. (0.75 mole) of 3,4-hexanedione and 9 ml. of hydrochloric acid, and 106.5 g. (1.50 mole) of chlorine is liquefied at −75° C. The gas inlet tube is immersed below the surface of the flask contents and the liquid chlorine is permitted to warm and boil off into the mixture in the flask. As the gaseous chlorine is introduced into the flask with vigorous agitation, the flask temperature rapidly rises to 45° C. Cooling is applied to the flask, and the temperature is maintained at 35-40° C. during the two hours required for addition of the chlorine.

The flask is then cooled to 0° to 10° C. and held for an additional hour after chlorine addition is completed. At the end of this time 100 ml. of chloroform is added to the flask. The chloroform layer is separated from the mixture and washed four times with 25 ml. of water to remove HCl. The chloroform solution is then dried by filtration through sodium sulfate.

The chloroform is then removed by distillation until the pot temperature reaches 100° C. The yellow-colored residue is then distilled under vacuum in a Vigreaux column equipped with a variable takeoff head. The 2,5-dichloro-3,4-hexanedione is obtained at 73°-75° C. and 10 mm. Hg.

A reaction flask equipped with a nitrogen gas feed tube, reflux condenser, and agitator is charged with 30 ml. of water. After heating the water to 85° C., 2.5 g. of 2,5-dichloro-3,4-hexanedione produced above is added and heating is continued. When the temperature reaches 90° C., 5 ml. of water containing 1.09 g. of sodium hydroxide is added and the resulting mixture is heated at reflux for 11 hours. At this time PMR analysis of the aqueous reaction mixture shows the presence of 2,5-dimethyl-4-hydroxy-[(2H)]-furan-3-one by the appearance of a doublet signal at 1.45 ($J=7$ Hz.) and a doublet signal at 2.29 ($J=1.4$ Hz.) p.p.m.

Example III

A reaction flask equipped with a nitrogen gas feed tube, reflux condenser and agitator is charged with 40 ml. of water, 0.88 g. of sodium hydroxide and 4.0 g. of 2,5-diiodo-3,4-hexanedione. The resulting mixture is then heated at reflux for three hours.

At this time PMR analysis of the aqueous reaction mixture shows the presence of 2,5-dimethyl-4-hydroxy-[(2H)]-furan-3-one by the appearance of a doublet signal at 1.45 ($J=7$ Hz.) and a signal at 2.30 p.p.m. The furanone is separated from the reaction mixture as described hereinabove.

What is claimed is:

1. A process for the production of a 2,5-dialkyl-4-hydroxy-(2H)-furan-3-one which comprises reacting a dihalo-diketone having the formula

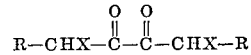

wherein X is a halogen atom and R is lower alkyl, with an aqueous alkali metal or alkaline earth metal hydroxide at a temperature of from about 75° C. to about 125° C.

2. A process according to claim 1 wherein the temperature is about 80° C. to about 105° C.

3. A process according to claim 1 wherein X is chloro, bromo, or iodo.

4. A process according to claim 1 wherein X is bromo.

5. A process according to claim 1 wherein the alkali metal is lithium, sodium, or potassium or the alkaline earth metal is calcium.

6. A process according to claim 1 wherein the dihalo-diketone is reacted with sodium or potassium hydroxide or a mixture thereof.

7. A process according to claim 1 wherein R is a lower alkyl group having from one to three carbon atoms.

8. A process according to claim 1 wherein R is methyl.

9. A process according to claim 1 wherein the reaction is carried out at a pressure of from about one to about two atmospheres.

10. A process according to claim 1 wherein the process is carried out by refluxing an aqueous mixture of the dihalodiketone and the hydroxide.

11. A process according to claim 1 wherein the dihalodiketone is produced by reacting a dialkanoyl with a halogen in the present of a hydrogen halide.

12. A process according to claim 11 wherein the halogen is chlorine.

References Cited

Tonsbeek et al.: Chemical Abst. (1970), vol. 72, 20702v.

ALEX MAZEL, Primary Examiner

B. I. DENTZ, Assistant Examiner

U.S. Cl. X.R.

99—140